US012025413B1

(12) United States Patent
Minica et al.

(10) Patent No.: US 12,025,413 B1
(45) Date of Patent: Jul. 2, 2024

(54) LIGHTED TARGET AIDE

(71) Applicants: Stuart Minica, La Vernia, TX (US); Steven C. Holmberg, Falconer, NY (US); Randal P. Stuart, Falconer, NY (US); Stephen W. Cass, Falconer, NY (US)

(72) Inventors: Stuart Minica, La Vernia, TX (US); Steven C. Holmberg, Falconer, NY (US); Randal P. Stuart, Falconer, NY (US); Stephen W. Cass, Falconer, NY (US)

(73) Assignee: Double Take Archery, LLC, La Vernia, TX (US)

( * ) Notice: Subject to any disclaimer, the term of this patent is extended or adjusted under 35 U.S.C. 154(b) by 14 days.

(21) Appl. No.: 17/574,291

(22) Filed: Jan. 12, 2022

Related U.S. Application Data

(60) Provisional application No. 63/136,633, filed on Jan. 12, 2021.

(51) Int. Cl.

| | |
|---|---|
| ***F41J 3/00*** | (2006.01) |
| ***F21S 9/02*** | (2006.01) |
| ***F21V 21/08*** | (2006.01) |
| ***F21V 21/088*** | (2006.01) |
| ***F21V 23/04*** | (2006.01) |

(52) U.S. Cl.
CPC ............... *F41J 3/0004* (2013.01); *F21S 9/02* (2013.01); *F21V 21/08* (2013.01); *F21V 21/0885* (2013.01); *F21V 23/0421* (2013.01)

(58) Field of Classification Search
CPC .... F41J 3/0004; F41J 3/02; F21S 9/02; F21V 23/0421; F21V 21/0885; F21V 21/08; F21V 21/0824
See application file for complete search history.

(56) References Cited

U.S. PATENT DOCUMENTS

| | | | | | |
|---|---|---|---|---|---|
| 2,201,527 | A * | 5/1940 | Freeman | F41J 13/00 | 273/404 |
| 2,508,250 | A * | 5/1950 | Goffstein | G09F 13/28 | 40/550 |
| 2,633,360 | A * | 3/1953 | Fleigle | F41J 3/0019 | 273/403 |
| 4,266,776 | A * | 5/1981 | Goldfarb | F41G 3/2655 | 463/52 |

(Continued)

*Primary Examiner* — Peggy A Neils
*Assistant Examiner* — James M Endo
(74) *Attorney, Agent, or Firm* — Taboada Law Firm, PLLC; John M Taboada

(57) ABSTRACT

Methods and systems for aided target shooting are disclosed, including providing a lighted target aide having a target aide body having a light source; a power source at least partially disposed within the target aide body and switchably coupled to the light source; and an insertion member coupled to the target aide body, wherein the insertion member is configured to removably couple the lighted target aide to a target; placing the lighted target aide in an illuminated state; attaching the lighted target aide to the target by inserting the insertion member into the target or attaching the insertion member to the target; and using light emitted from the lighted target aide as a guide when shooting an arrow or ammunition to the target. Other embodiments are described and claimed.

8 Claims, 8 Drawing Sheets

(56) References Cited

U.S. PATENT DOCUMENTS 4,417,299 A * 11/1983 Rupp ........................ F21L 2/00 362/120
4,830,369 A * 5/1989 Poitras .................. A63B 63/00 473/455
5,102,362 A * 4/1992 Denen ....................... F21L 2/00 140/71 R
5,134,552 A * 7/1992 Call ...................... F42B 12/382 362/276
5,142,461 A * 8/1992 Nugent ............... F21V 21/0832 362/396
5,169,157 A * 12/1992 Salmon ...................... F41J 1/10 242/538.2
5,195,266 A * 3/1993 Troescher .............. A01K 85/01 43/17.5
5,238,425 A * 8/1993 Kliewer ................ F21V 19/006 248/216.1
5,279,061 A * 1/1994 Betz .......................... F41G 1/34 42/144
5,303,133 A * 4/1994 Wagner ..................... F21L 2/00 362/206
5,425,542 A * 6/1995 Blackwood ........... F42B 12/362 473/578
5,725,217 A * 3/1998 White ........................ F41J 1/10 273/403
5,785,592 A * 7/1998 Jacobsen ................. A63F 13/28 463/52
5,829,753 A * 11/1998 Wiser ......................... F41J 1/10 273/407
6,132,060 A * 10/2000 Gallo ........................ F21S 9/02 362/253
7,040,783 B1 * 5/2006 Christianson ............. F21L 4/04 362/186
7,300,367 B1 * 11/2007 Andol ....................... F42B 6/04 473/578
7,301,469 B1 * 11/2007 Hoffman ................ G08B 21/24 362/85
8,113,930 B1 * 2/2012 Coats ..................... F41J 3/0019 273/348
8,172,419 B1 * 5/2012 Gasparre ................. F21L 4/005 362/108
10,094,642 B1 * 10/2018 Godsey ..................... F42B 6/06
10,254,095 B1 * 4/2019 Wang ...................... F21V 23/04
2002/0021567 A1 * 2/2002 Brown ...................... F21L 4/00 362/800
2005/0270770 A1 * 12/2005 Warrender .......... F21V 33/0012 362/157
2007/0153525 A1 * 7/2007 Helget ................ F21V 21/0832 362/276
2008/0042866 A1 * 2/2008 Morse .................... G08B 21/02 340/539.1
2014/0042291 A1 * 2/2014 Colarusso ............... F21V 21/00 248/544
2014/0265135 A1 * 9/2014 Saunders ................... F41J 7/04 273/392
2018/0087883 A1 * 3/2018 Wynn ................. F21V 23/0407

* cited by examiner

LIGHTED TARGET AIDE

I. CROSS REFERENCE TO RELATED APPLICATIONS

This application claims the benefit of the filing date of U.S. Provisional Patent Application Ser. No. 63/136,633, filed on Jan. 12, 2021, entitled “Lighted Archery Target Aide,” the entire disclosure of which is hereby incorporated by reference into the present disclosure.

II. BACKGROUND

The invention relates generally to the field of targets. More specifically, this invention relates to a lighted target aide used to guide a user to a desired area of a target.

III. SUMMARY

In one respect, disclosed is a lighted target aide comprising: a target aide body comprising a light source; a power source at least partially disposed within the target aide body and switchably coupled to the light source; and an insertion member coupled to the target aide body, wherein the insertion member is configured to removably couple the lighted target aide to a target.

In another respect, disclosed is a method for aided target shooting, comprising: providing a lighted target aide comprising: a target aide body comprising a light source; a power source at least partially disposed within the target aide body and switchably coupled to the light source; and an insertion member coupled to the target aide body, wherein the insertion member is configured to removably couple the lighted target aide to a target; placing the lighted target aide in an illuminated state; attaching the lighted target aide to the target by inserting the insertion member into the target or attaching the insertion member to the target; and using light emitted from the lighted target aide as a guide when shooting an arrow or ammunition to the target.

Numerous additional embodiments are also possible.

IV. BRIEF DESCRIPTION OF THE DRAWINGS

Other objects and advantages of the invention may become apparent upon reading the detailed description and upon reference to the accompanying drawings.

Figure 1:
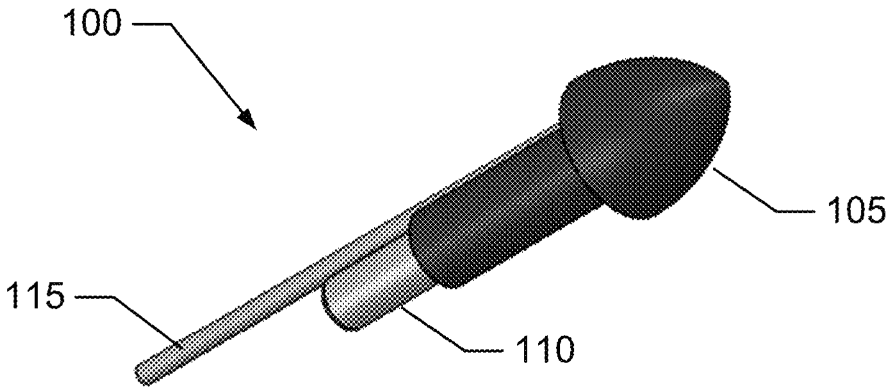
FIG. 1 is a side perspective view of a lighted target aide, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

FIG. 1 is a side perspective view of a lighted target aide, in accordance with some embodiments.

Figure 2:
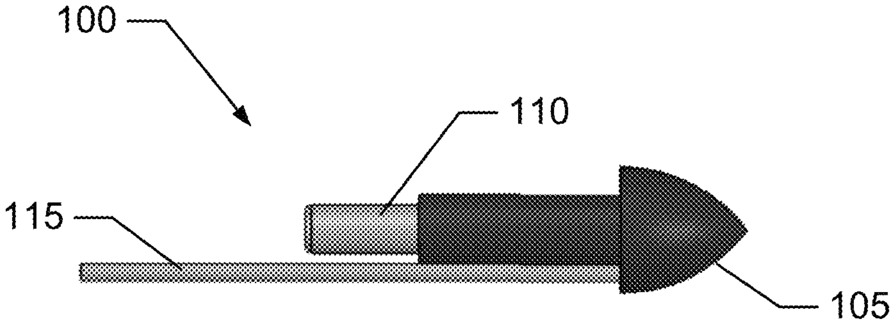
FIG. 2 is a side view of the lighted target aide of FIG. 1 in the “Off” un-illuminated state, in accordance with some embodiments.

FIG. 2 is a side view of the lighted target aide of FIG. 1 in the “Off” un-illuminated state, in accordance with some embodiments.

Figure 3:
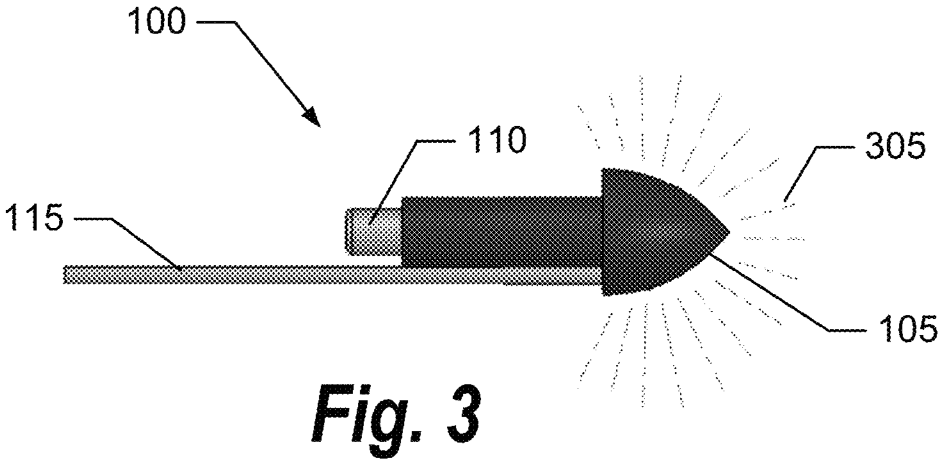
FIG. 3 is a side view of the lighted target aide of FIG. 1 in the “On” illuminated state, in accordance with some embodiments.

FIG. 3 is a side view of the lighted target aide of FIG. 1 in the “On” illuminated state, in accordance with some embodiments.

Figure 4:
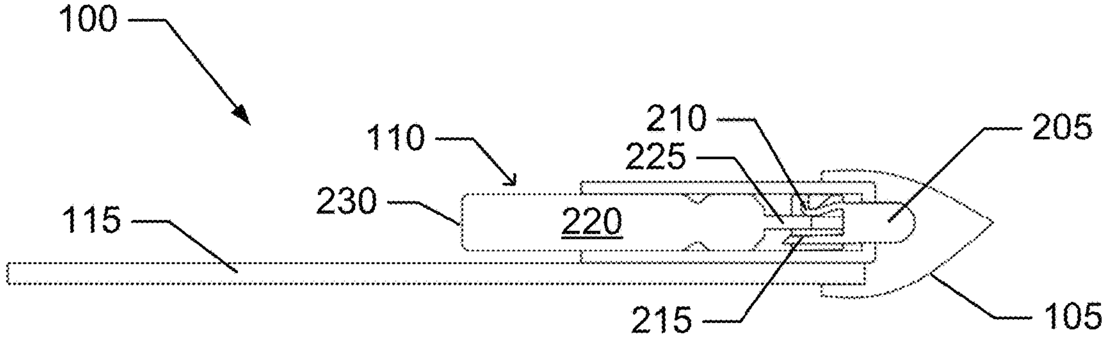
FIG. 4 is a side cross-sectional view of the lighted target aide of FIG. 1 in the “Off” un-illuminated state, in accordance with some embodiments.

FIG. 4 is a side cross-sectional view of the lighted target aide of FIG. 1 in the “Off” un-illuminated state, in accordance with some embodiments.

Figure 5:
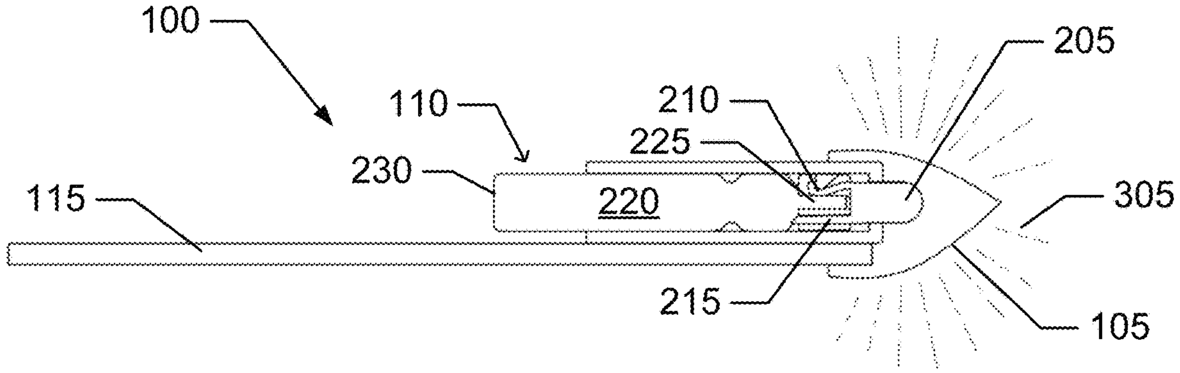
FIG. 5 is a side cross-sectional view of the lighted target aide of FIG. 1 in the “On” illuminated state, in accordance with some embodiments.

FIG. 5 is a side cross-sectional view of the lighted target aide of FIG. 1 in the “On” illuminated state, in accordance with some embodiments.

Figure 6:
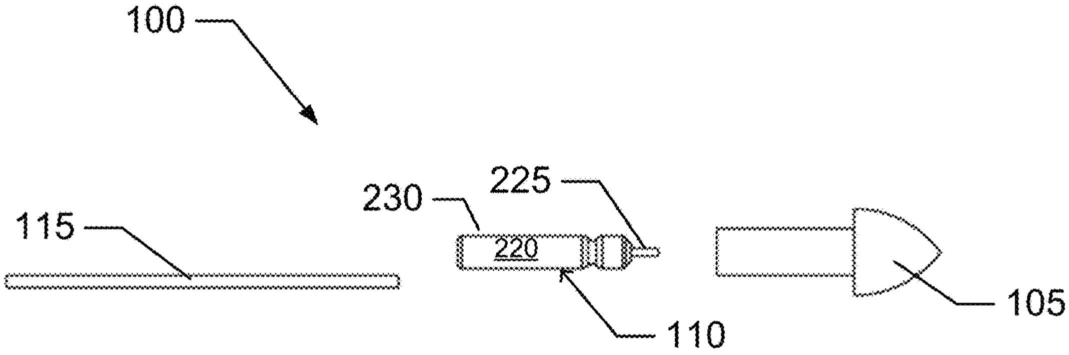
FIG. 6 is an exploded side view of the lighted target aide of FIG. 1, in accordance with some embodiments.

FIG. 6 is an exploded side view of the lighted target aide of FIG. 1, in accordance with some embodiments.

Figure 7:
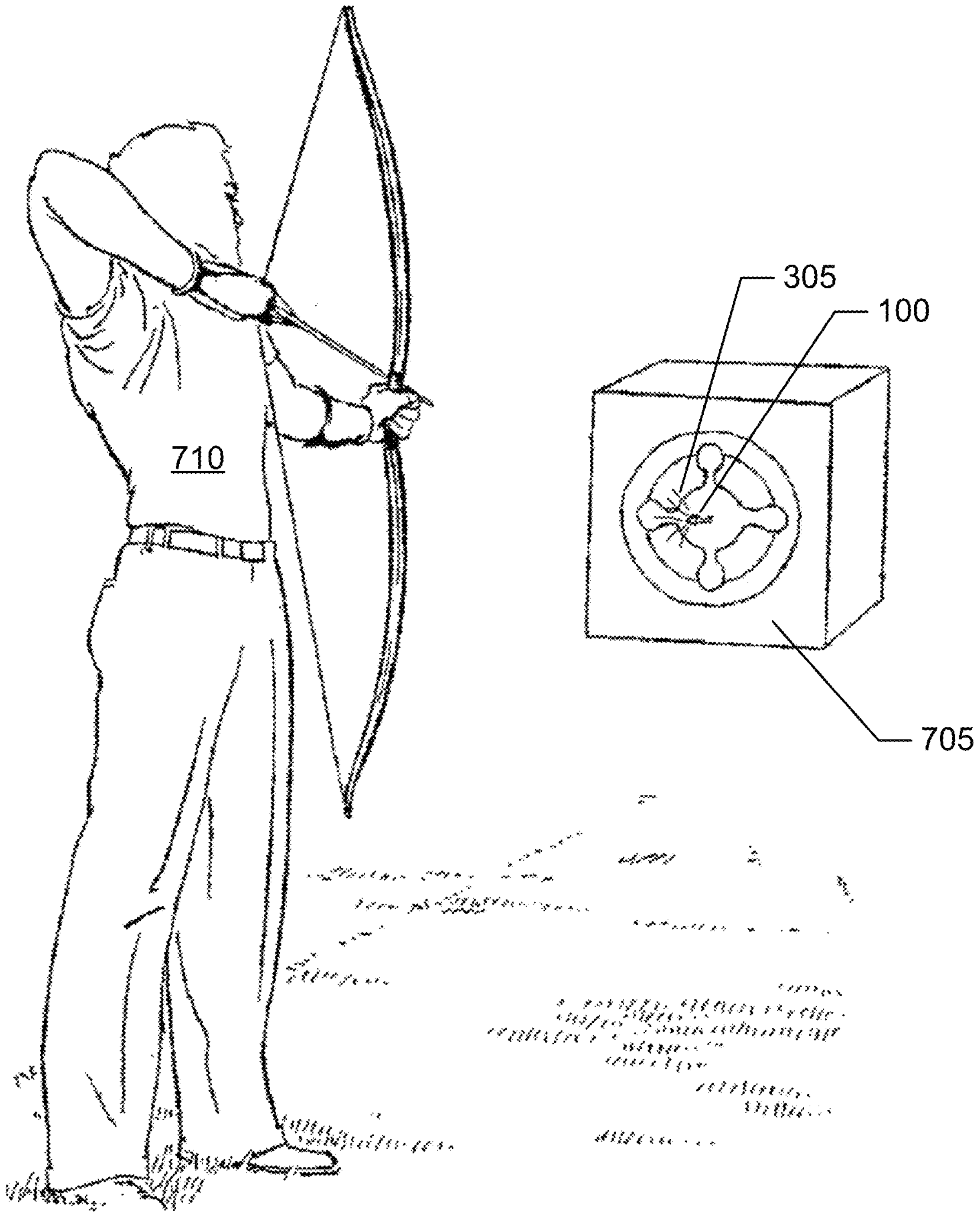
FIG. 7 is a perspective view of a user in a position ready to fire an arrow at the lighted target aide inserted into the target, in accordance with some embodiments.

FIG. 7 is a perspective view of a user in a position ready to fire an arrow at the lighted target aide inserted into the target, in accordance with some embodiments.

In some embodiments, the lighted target aide 100 comprises a target aide body 105, a power source 110 partially disposed within the target aide body, and an insertion member 115 coupled to the target aide body and configured to removably couple the lighted target aide to a target 705, wherein the target aide body 105 comprises a light source 205 having a first lead 210 and a second lead 215, and the power source 110 comprises a battery 220 having a post terminal 225 and a shell terminal 230, such as but not limited to a 3V lithium BR435 pin type battery, configured to slide into the target aide body to place the lighted target aide into the “On” illuminated state and away from the target aide body to place the lighted target aide into the “Off” un-illuminated state. In the “On” illuminated state, as illustrated in FIGS. 3 and 5, the power source is pushed into the target aide body to close the electrical circuit between the power source and light source. The electrical circuit is closed when the second lead 215 makes contact with the shell terminal 230 of the battery. To place the lighted target aid in the "Off" un-illuminated state, as illustrated in FIGS. 1, 2, and 4, the power source is pulled out away from the target aide body to open the electrical circuit between the power source and light source. The electrical circuit is opened when the second lead 215 is separated from the shell terminal 230 of the battery.

A user 710 may use the lighted target aide 100, by inserting the insertion member 115 of the lighted target aide either in an "On" illuminated state or an "Off" un-illuminated state into the desired position of a target 705. If the lighted target aide was inserted into the target in an un-illuminated state, the lighted target aide can be placed into the "On" illuminated state after insertion into the target. The light 305 emitted from the lighted target aide helps the user see the desired position on the target that they wish to hit with the arrow.

In some embodiments, the post terminal 225 is negative and the shell terminal 230 is positive and thus the first lead 210 is the cathode of the light source and the second lead 215 is the anode of the light source. In alternative embodiments, the post terminal 225 is positive and the shell terminal 230 is negative and thus the first lead 210 is the anode of the light source and the second lead 215 is the cathode of the light source.

In some embodiments, battery 220 is a tubular dry cell battery, such as (but not limited to) a common alkaline, zinc-air, lithium, lithium ion, or other small cell currently known or in use today.

In some embodiments, the target aide body and the insertion member are not only coupled together but may form an integrated assembly. In such an apparatus, the integrated assembly is unibody. Accordingly, the concepts, apparatus, and techniques described herein are not limited to any particular combination of these components.

In some embodiments, the target aide body 105 is formed of a monolithic piece of rigid material, such as (but not limited to) plastic, polycarbonate, compounds thereof and the like, all of which are well known in the art for their suitability to be translucent to the light emitted from the light source. Alternatively, the target aide body 105 may be formed from one or more pieces of rigid material, such as (but not limited to) metal, plastic, polycarbonate, compounds thereof and the like, and then joined together via conventional means. Such forming and/or joining may be accomplished through any methods known in the art for producing metal and plastic materials. Accordingly, the method of making the target aide body is not further discussed herein.

Although the functionality of light source 205 may, in some exemplary embodiments, be provided by an LED, those skilled in the art will realize that light sources other than LEDs may also be used. Accordingly, the concepts, systems, and techniques described herein are not limited to any particular type of light source.

In some embodiments, the lighted target aide may be placed into the "On" illuminated state and the "Off" un-illuminated state with a screwably coupled power source and target aide body, a linear slide switch, an electronic switch, or a mechanically-maintained type of switch, also known as a latching, push button, or push on-push off switch.

In some embodiments, the lighted target aide may be configured to indicate to the user that the target has been hit. In such as embodiment, the light target aide further comprises an impact sensor member configured to detect and respond to a strike of the target. When the target is hit, the light source may flash on and off, change to a different color, flash between two or more colors, and/or a combination of the like.

Figure 8:
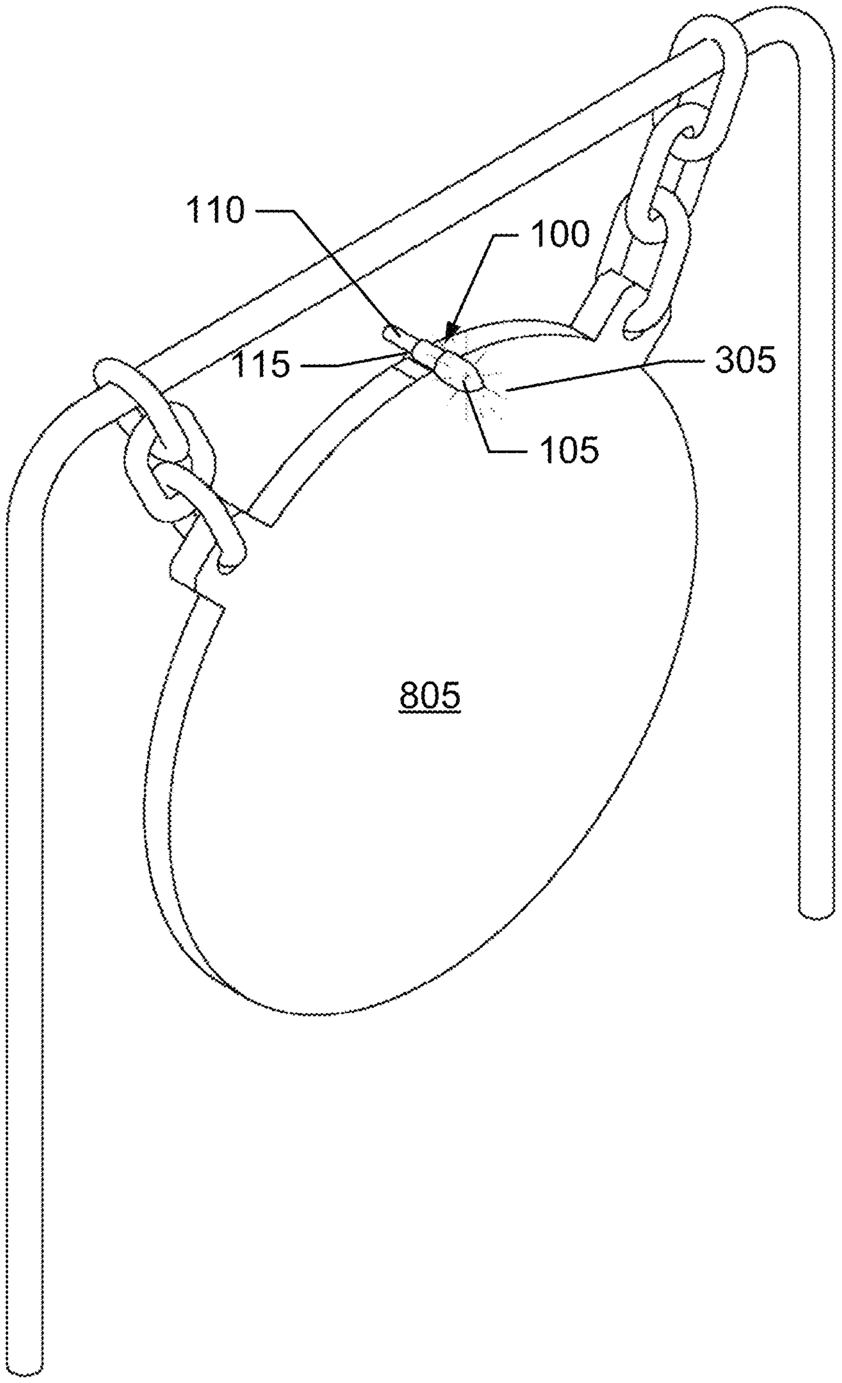
FIG. 8 is a side perspective view of a gong assembly with a lighted target aide, in accordance with some embodiments.

FIG. 8 is a side perspective view of a gong assembly with a lighted target aide, in accordance with some embodiments.

Figure 9:
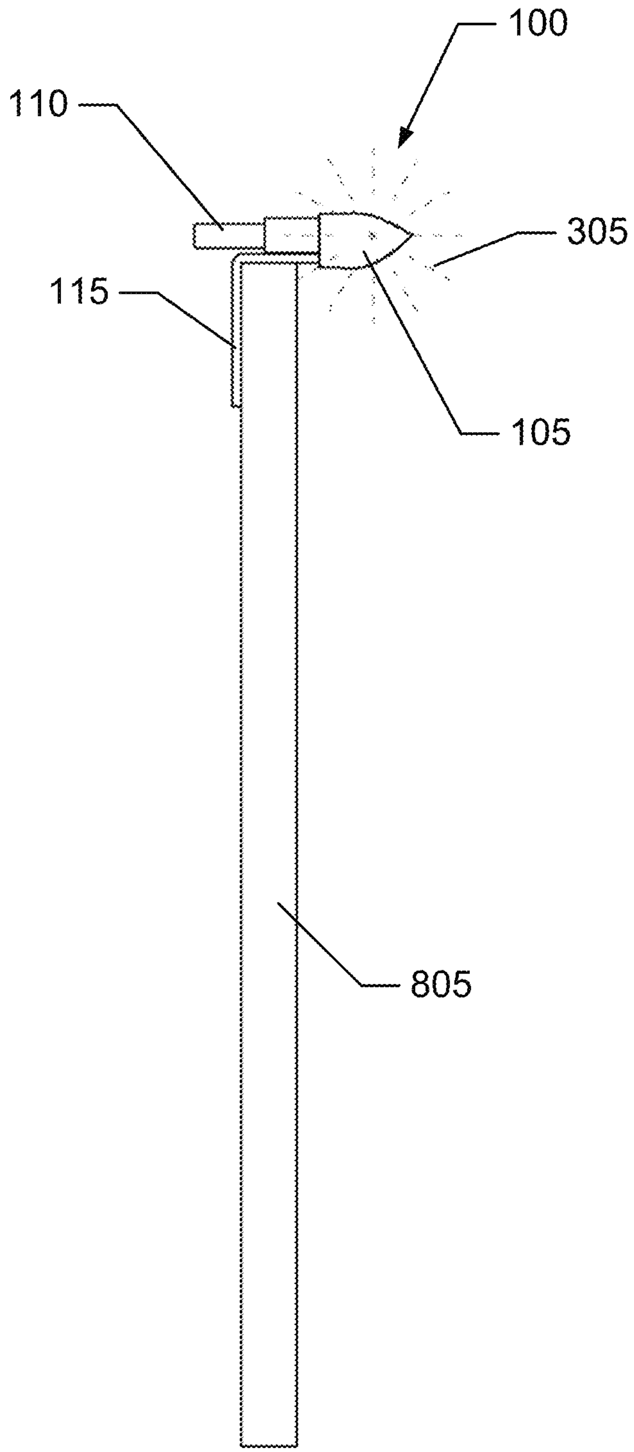
FIG. 9 is a side view of the gong assembly with the lighted target aide of FIG. 8, in accordance with some embodiments.

FIG. 9 is a side view of the gong assembly with the lighted target aide of FIG. 8, in accordance with some embodiments.

Figure 10:
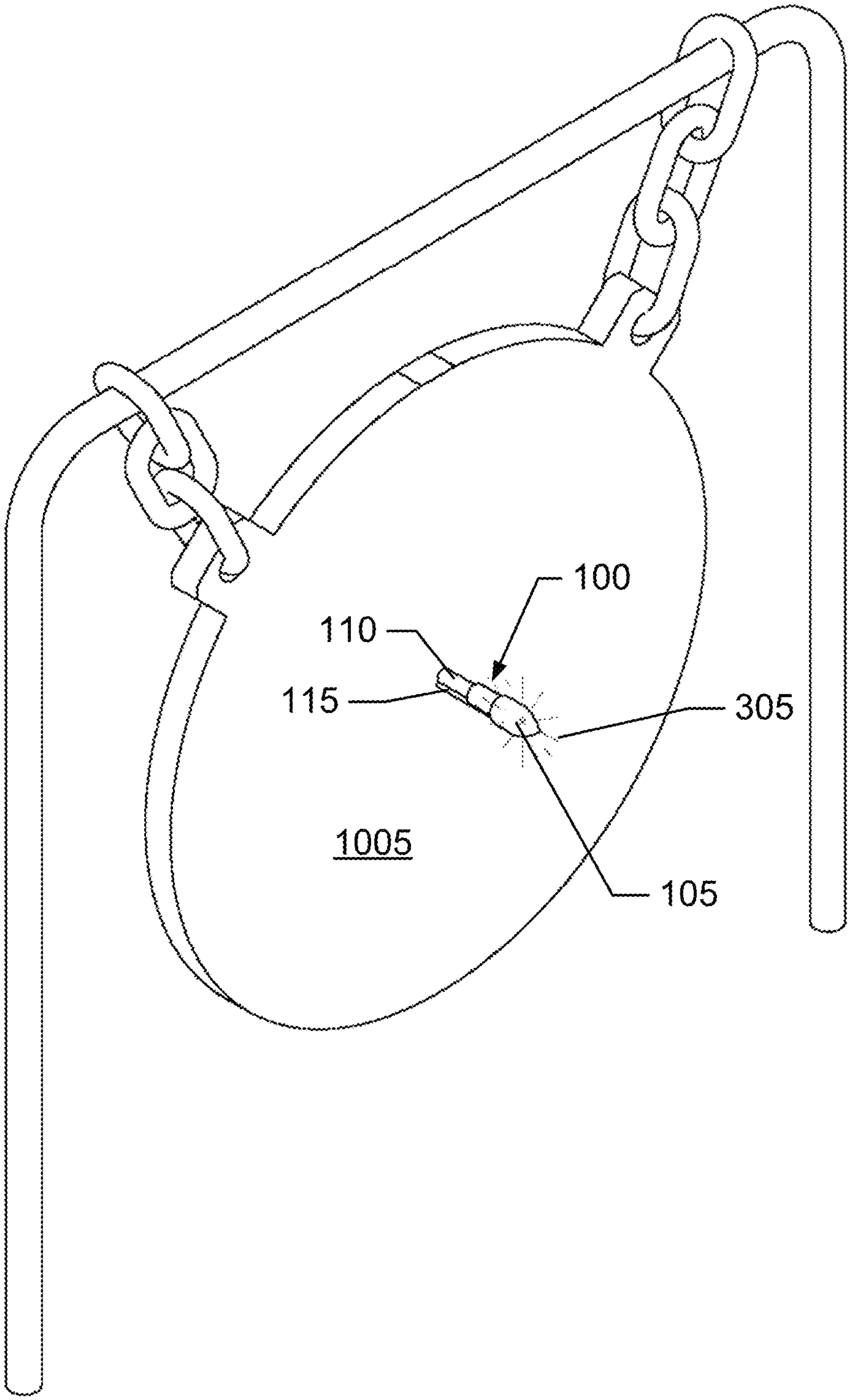
FIG. 10 is a side perspective view of a gong assembly with a lighted target aide, in accordance with some embodiments.

FIG. 10 is a side perspective view of a gong assembly with a lighted target aide, in accordance with some embodiments.

Figure 11:
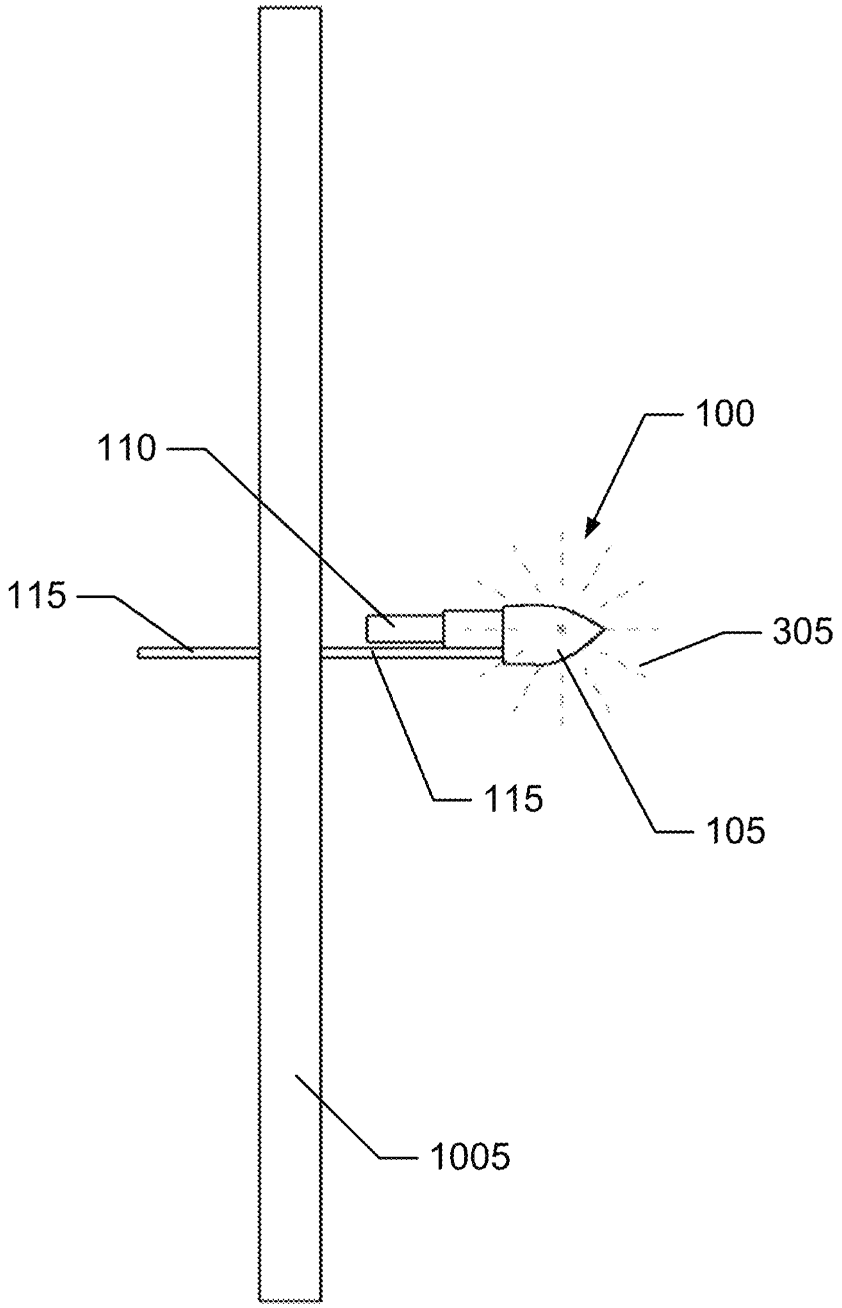
FIG. 11 is a side view of the gong assembly with the lighted target aide of FIG. 10, in accordance with some embodiments.

FIG. 11 is a side view of the gong assembly with the lighted target aide of FIG. 10, in accordance with some embodiments.

In some embodiments, the devices illustrated in FIG. 1, FIG. 2, FIG. 3, FIG. 4, FIG. 5, and FIG. 6 may be used with a gong target made of a metal such as steel for firearms. In such an embodiment, the lighted target aide 100 comprises a target aide body 105, a power source 110 partially disposed within the target aide body, and an insertion member 115 coupled to the target aide body and configured to removably couple the lighted target aide to a gong target 805, 1005, wherein the target aide body 105 comprises a light source having a first lead and a second lead, and the power source 110 comprises a battery having a post terminal and a shell terminal, such as but not limited to a 3V lithium BR435 pin type battery, configured to slide into the target aide body to place the lighted target aide into the "On" illuminated state and away from the target aide body to place the lighted target aide into the "Off" un-illuminated state. In the "On" illuminated state, as illustrated in FIGS. 8-11, the power source is moved into the target aide body to close the electrical circuit between the power source and light source. The electrical circuit is closed when the second lead makes contact with the shell terminal of the battery. To place the lighted target aid in the "Off" un-illuminated state, the power source is moved out away from the target aide body to open the electrical circuit between the power source and light source. The electrical circuit is opened when the second lead is separated from the shell terminal of the battery.

In some embodiments, a user may use the lighted target aide, by attaching the insertion member, having a bend, of the lighted target aide to the back side of the gong target 805 either in an "Off" un-illuminated state or an "On" illuminated state, as illustrated in FIGS. 8 and 9. The lighted target aide can be attached for example by taping the insertion member to the back side of the gong target or alternatively with the insertion member comprising a magnet or being magnetized. In yet another embodiment, the outer side wall of the target aide body may be configured to be attached to a hook-and-loop fastener attached to the edge of the gong target. In such an embodiment, the insertion member of the lighted target aide is not necessary and may be eliminated. If the lighted target aide was attached to the gong target in an un-illuminated state, the lighted target aide can be placed into the "On" illuminated state after attachment to the gong target. The light 305 emitted from the lighted target aide helps the user see the gong target that they wish to hit with the firearm.

In some embodiments, a user may use the lighted target aide, by inserting the insertion member 115 of the lighted target aide into a hole on the surface of the gong target 1005 either in an "Off" un-illuminated state or an "On" illuminated state, as illustrated in FIGS. 10 and 11. If the lighted target aide was inserted into the gong target in an un-illuminated state, the lighted target aide can be placed into the "On" illuminated state after insertion to the gong target.

The light 305 emitted from the lighted target aide helps the user see the gong target that they wish to hit with the firearm. In the embodiment illustrated in FIGS. 10 and 11, there is a higher chance that the lighted target aide will be damaged or destroyed by the scattered fragments released from the gong target as a result of being hit by the projectile. Damage or destruction of the lighted target aide is less likely in the embodiment illustrated in FIGS. 8 and 9.

Figure 12:
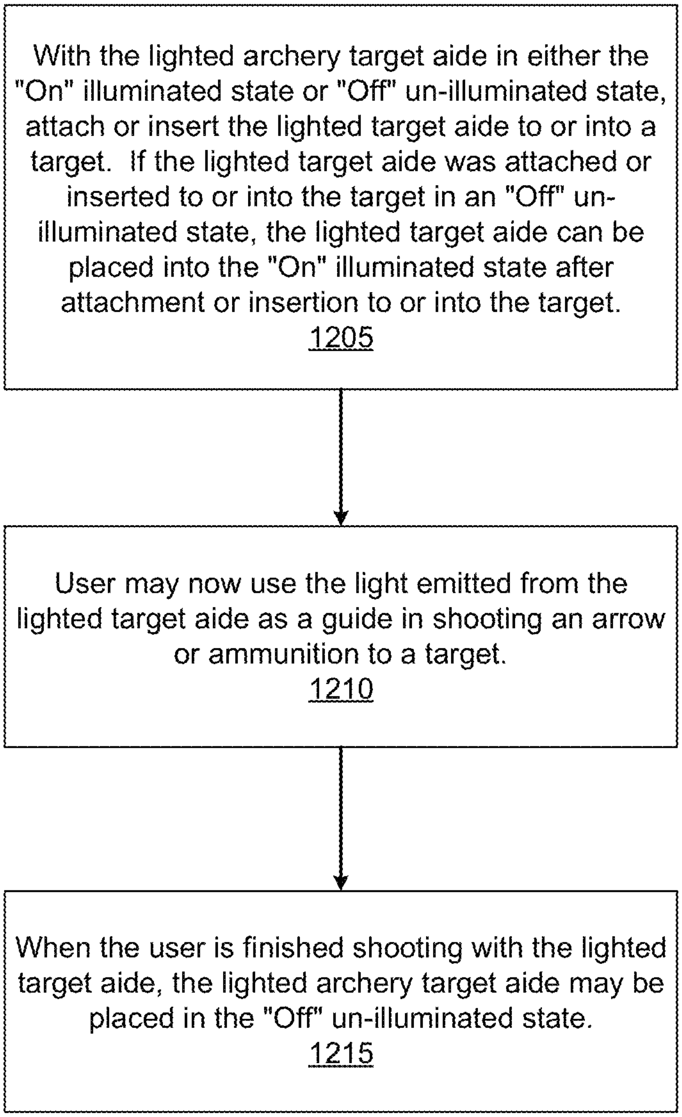
FIG. 12 is a flowchart illustrating a method for using the lighted target aide, in accordance with some embodiments.

FIG. 12 is a flowchart illustrating a method for using the lighted target aide, in accordance with some embodiments. In some embodiments, the method illustrated in FIG. 12 may be performed by one or more of the devices illustrated in FIG. 1, FIG. 2, FIG. 3, FIG. 4, FIG. 5, FIG. 6, FIG. 8, FIG. 9, FIG. 10, and FIG. 11.

The method begins at block 1205, where, with the lighted target aide in either the "On" illuminated state or "Off" un-illuminated state, the lighted target aide is attached to a target by attaching or inserting the insertion member of the lighted target aide to or into the target. If the lighted target aide was attached or inserted to or into the target in an "Off" un-illuminated state, the lighted target aide can be placed into the "On" illuminated state after attachment or insertion to or into the target. At block 1210, a user may use the light emitted from the lighted target aide as a guide in shooting an arrow or ammunition to a target. When the user is finished shooting with the lighted target aide, at block 1215, the lighted target aide may be placed in the "Off" un-illuminated state. Although the flowchart may describe the operations as a sequential process, the order of the operations may be rearranged.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. A lighted target aide, comprising:

a target aide body comprising a light source;

a power source partially disposed within the target aide body and switchably coupled to the light source; and an insertion member coupled to the target aide body, wherein the insertion member is configured to removably couple the lighted target aide to a target;

wherein the power source is configured to be switchably coupled to the light source when the lighted target aide is coupled to the target;

wherein the power source is configured to allow the user to slide the power source into the target aide body to close an electrical circuit between the power source and the light source in order to place the lighted target aide into an illuminated state; wherein the power source is configured to allow the user to slide the power source away from the target aide body to open the electrical circuit between the power source and the light source in order to place the lighted target aide into an un-illuminated state; and wherein light from the light source is projected away from where the insertion member is coupled to the target to guide a user shooting an arrow or ammunition to a desired area of the target.

2. The lighted target aide of claim 1, wherein the light source comprises a first lead and a second lead;

wherein the power source comprises a battery having a post terminal and a shell terminal;

wherein the electrical circuit is closed when the first lead is in contact with the post terminal and the second lead is in contact with the shell terminal; and wherein the electrical circuit is open when the second lead is separated from the shell terminal.

3. The lighted target aide of claim 2, wherein the post terminal is negative;

wherein the shell terminal is positive;

wherein the first lead is a cathode of the light source; and wherein the second lead is an anode of the light source.

4. The lighted target aide of claim 2, wherein the post terminal is positive;

wherein the shell terminal is negative;

wherein the first lead is an anode of the light source; and wherein the second lead is a cathode of the light source.

5. A method for aided target shooting, comprising:

providing a lighted target aide comprising:

a target aide body comprising, a light source;

a power source partially disposed within the target aide body and switchably coupled to the light source; and an insertion member coupled to the target aide body, wherein the insertion member is configured to removably couple the lighted target aide to a target, wherein the power source is configured to be switchably coupled to the light source when the lighted target aide is coupled to the target;

wherein the power source is configured to allow the user to slide the power source into the target aide body to close an electrical circuit between the power source and the light source in order to place the lighted target aide into an illuminated state;

wherein the power source is configured to allow the user to slide the power source away from the target aide body to open the electrical circuit between the power source and the light source in order to place the lighted target aide into an un-illuminated state; and wherein light from the light source is projected away from where the insertion member is coupled to the target to guide a user shooting an arrow or ammunition to a desired area of the target;

placing, the lighted target aide in an illuminated state;

attaching the lighted target aide to the target by inserting the insertion member into the target or attaching the insertion member to the target; and using light emitted from the lighted target aide as a guide when shooting the arrow or ammunition to the target.

6. The method for aided target shooting of claim 5, wherein the light source comprises a first lead and a second lead;

wherein the power source comprises a battery having a post terminal and a shell terminal;

wherein the electrical circuit is closed when the first lead is in contact with the post terminal and the second lead is in contact with the shell terminal; and wherein the electrical circuit is open when the second lead is separated from the shell terminal.

7. The method for aided target shooting of claim 6, wherein the post terminal is negative;

wherein the shell terminal is positive;

wherein the first lead is a cathode of the light source; and wherein the second lead is an anode of the light source.

8. The method for aided target shooting of claim 6, wherein the post terminal is positive;

wherein the shell terminal is negative;

wherein the first lead is an anode of the light source; and wherein the second lead is a cathode of the light source.

* * * * *